Patented Feb. 15, 1938

2,108,387

UNITED STATES PATENT OFFICE 2,108,387

VISCOUS, WATERPROOF AND INSULATING COMPOSITION WITH A BASIS OF RUBBER, TO BE USED HOT OR COLD

Nello Nardelli, Florence, Italy

No Drawing. Application December 14, 1934, Serial No. 757,588

5 Claims. (Cl. 106—23)

The subject-matter of this invention is a composition based on rubbers in general with marked viscous, waterproof and insulating properties, that can be used either hot or cold.

In pursuance of the above mentioned prerogatives, the composition likewise prevents skidding and slipping besides being a noise damper, thereby opening up a very vast field for its use.

It can be used to make walls, attics, roofs, tubs, reservoirs, terraces, etc. waterproof, either plain or with rubble, waste or pieces of any kind of materials. By the term rubble is meant stones which have been broken into small pieces somewhat larger than normal granulated rock but smaller than an ordinary crushed rock. With gravel, rubble, chips and other residues, it can be used to give a surface to roads, floors, etc. that will prevent skidding, as well as to construct and repair streets and floorings in general as a binding agent for suitable materials, to prevent outside tyres of motor vehicles in general from skidding, as well as the wheels or rails of railways, trams, etc. and to make paper, cardboard, cloth, stuffs, wood, string, cord, piping, etc. waterproof, to caulk boats and the like, to replace bird-lime, to replace putty, and in farming, wine making, fruit growing and in other industries as a binding or conglomerating agent for organic and inorganic materials.

The process to obtain the composition in question consists in melting any kind of rubber or caoutchouc with a moderate amount of heat in a boiler or any other suitable vessel, either alone or with other suitable substances, such as colophony, fatty oils, bituminous substances, hydrocarbons, resins, etc. The mixture must be stirred with a ladle or any other means during melting, until the rubber or composition will be completely liquid. Rubber of any kind or origin can be used, to wit, raw, new, old, worked, waste, warty, natural, dry, synthetic, and these kinds can be used either alone or in a mixture of them.

Besides rubber, all those substances coming from it, such as caoutchouc, vulcanite, etc., or those which contain a minimum part, must be considered as being included. When the melted rubber is taken from the boiler, the composition is ready for use at once or at any time in the future. If it is not to be used at once, the composition must be poured into holders, such as boxes, tubes, barrels or any kind of vessel, and where it is necessary, these holders are heated, when the composition becomes liquid and is again ready for use.

Other suitable substances can be added during or after melting. The proportions can vary of course, according to the different kinds of rubber used, which, as mentioned hereinbefore, can be of any origin, and raw, old, synthetic, etc. in compliance with what the composition is to be used for.

For instance, if the composition should be used to replace asphalt, tar or bitumen, or should it be mixed with them for road building or repairs, for waterproof or insulating work, etc., the following proportions can be used: 80% of rubber of any kind and 20% of colophony and other substances. The percentage of colophony and other substances is not specific inasmuch as it can vary according to the kind of rubber used.

For example, if the composition is to replace bird-lime, the proportions can be: 95% of pure rubber with 5% of colophony and other substances. Also these proportions can of course vary according to the characteristics of the rubber melted in compliance with this system.

When colophony is one of the ingredients of the product, it has the advantage of making the composition more viscous and adhesive, as well as that of making it non-skidding and non-slipping.

In its many uses the composition is generally applied hot, but it can be used cold as well when it is dissolved in a suitable solvent, such as petrol, derivates of ethylene, etc. Finally, the composition can be used in the form of an emulsion in an oily liquid.

If the product should be required for road construction in tropical countries and to join and fix floorings of any kind of materials, especially of vulcanized rubber, after melting, vulcanized rubber in coarse or fine powder should be added, or sulphur in the proportion of from 1 to 50%, or more, since this element makes the composition harder and allows it to set better with a greater resistance against heat. It is also useful to make noise damper bearings underneath, or at the side of railway lines, tram lines, etc.

I claim:

1. A viscous, tacky, waterproof, insulating, and friction composition of the class described, which is non-liquid at ordinary atmospheric temperatures and which comprises in combination melted rubber and colophony, in the following proportions: 75% to 95% of melted rubber, 25% to 5% of colophony.

2. A viscous, tacky, waterproof, insulating, and friction composition of the class described, which is non-liquid at ordinary atmospheric temperatures and which comprises in combination melted rubber and colophony, in the following proportions: about 80% of melted rubber, about 20% of colophony.

3. A viscous, tacky, waterproof, insulating, and friction composition of the class described, which is non-liquid at ordinary atmospheric temperatures and which comprises in combination melted rubber and colophony, in the following proportions: about 95% of melted rubber, about 5% of colophony.

4. A plastic composition comprising in combination melted rubber and colophony in the proportion of from 50% to 99% and pulverized, vulcanized rubber in the proportion of from 50% to 1%.

5. A plastic composition comprising in combination melted rubber and colophony in the proportion of from 50% to 99% and sulphur in the proportion of from 50% to 1%.

NELIO NARDELLI.